(12) United States Patent
Hong (10) Patent No.: US 7,889,704 B2
(45) Date of Patent: Feb. 15, 2011

(54) METHOD FOR IMPROVING EFFICIENCY IN A TIME SHARING NETWORK

(75) Inventor: Liang A. Hong, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 853 days.

(21) Appl. No.: 11/169,703

(22) Filed: Jun. 30, 2005

(65) Prior Publication Data

US 2005/0238042 A1   Oct. 27, 2005

Related U.S. Application Data

(63) Continuation of application No. 09/546,794, filed on Apr. 11, 2000, now Pat. No. 6,937,609.

(60) Provisional application No. 60/135,994, filed on May 25, 1999.

(51) Int. Cl.
*H04B 7/212* (2006.01)
*H04L 12/43* (2006.01)

(52) U.S. Cl. ........................ 370/337; 370/347; 370/459

(58) Field of Classification Search ................. 370/329, 370/336, 337, 345, 347, 349, 431, 442, 445, 370/447, 450, 458, 459, 461, 462
See application file for complete search history.

(56) References Cited

U.S. PATENT DOCUMENTS

| | | | |
|---|---|---|---|
| 4,412,326 A | 10/1983 | Limb | |
| 4,598,285 A | 7/1986 | Hoshen | |
| 4,774,707 A | 9/1988 | Raychaudhuri | |
| 5,012,469 A | 4/1991 | Sardana | |
| 5,124,985 A * | 6/1992 | Hoshikawa | .................. 370/347 |
| 5,303,234 A | 4/1994 | Kou | |
| 5,530,700 A | 6/1996 | Tran et al. | |
| 5,537,395 A | 7/1996 | Alles et al. | |
| 5,570,355 A | 10/1996 | Dail et al. | |

(Continued)

FOREIGN PATENT DOCUMENTS

EP   0 288 709   7/1987

(Continued)

OTHER PUBLICATIONS

Chockalingam et al., "Performance of a Wireless Access Protocol on Correlated Rayleigh-Fading Channels with Capture," IEEE Transactions on Communications, vol. 46, No. 5, May 1998.

(Continued)

*Primary Examiner*—Nittaya Juntima
(74) *Attorney, Agent, or Firm*—Woodcock Washburn LLP (57) ABSTRACT

The present invention provides methods for improving the performance and efficiency of time sharing wireless networks by reducing collisions, eliminating wasted bandwidth caused by unnecessary gaps between transmissions, and reducing the amount of control information broadcast from the base station. The present invention accomplishes this by synchronizing the actions of the remote units in the wireless network to the control messages sent by the base unit and having the base unit compensate for the inherent system latency in determining when control messages should be sent. The present invention also consolidates the functionality of some of the control messages in order to reduce bandwidth usage.

3 Claims, 7 Drawing Sheets

U.S. PATENT DOCUMENTS

| | | | |
|---|---|---|---|
| 5,570,364 A * | 10/1996 | Bar-David | 370/407 |
| 5,734,833 A | 3/1998 | Chiu et al. | |
| 5,740,167 A * | 4/1998 | Taketsugu et al. | 370/337 |
| 5,784,597 A | 7/1998 | Chiu et al. | |
| 5,883,901 A | 3/1999 | Chiu et al. | |
| 6,018,664 A * | 1/2000 | Skarin | 455/453 |
| 6,075,779 A * | 6/2000 | Agarwal et al. | 370/337 |
| 6,181,683 B1 * | 1/2001 | Chevillat et al. | 370/329 |
| 6,240,083 B1 | 5/2001 | Wright et al. | |
| 6,389,474 B1 | 5/2002 | Chien et al. | |
| 6,404,753 B1 | 6/2002 | Chien et al. | |
| 6,700,878 B2 | 3/2004 | Salazar et al. | |
| 6,813,277 B2 | 11/2004 | Edmon et al. | |

FOREIGN PATENT DOCUMENTS

| | | |
|---|---|---|
| EP | 0 462 572 | 12/1991 |
| EP | 0 744 849 | 11/1996 |
| WO | WO 95/30291 | 11/1995 |
| WO | WO 98/37669 | 8/1998 |

OTHER PUBLICATIONS

U.S. Appl. No. 09/148,315, filed Sep. 4, 1998.
Jun. 27, 2007 Search Report for EP 07101719.8.

* cited by examiner

METHOD FOR IMPROVING EFFICIENCY IN A TIME SHARING NETWORK

This application is a continuation of U.S. patent application Ser. No. 09/546,794, filed Apr. 11, 2000 (now U.S. Pat. No. 6,937,609), and claims priority to U.S. Provisional Application No. 60/135,994, filed May 25, 1999, both of which applications are incorporated herein by reference in their entireties.

FIELD OF THE INVENTION

The present invention is directed to methods for improving network efficiency in a time sharing network by reducing collisions, eliminating inter-transmission gaps, and reducing the amount of bandwidth used by control signals.

BACKGROUND OF THE INVENTION

The demand for wireless data services has increased dramatically in recent years and the increase is expected to continue for the foreseeable future. This increased demand has resulted in a need for more efficient methods of utilizing the limited wireless bandwidth that is available. Wireless data systems generally consist of a base unit communicating with multiple remote units using a forward channel and a reverse channel. The base unit transmits data to the remote units on the forward channel and the remote units transmit data to the base unit by time sharing the reverse channel. Access to the reverse channel is controlled through the use of a busy/idle flag transmitted by the base station so that a remote unit will not attempt to send a message when another remote unit is already accessing the channel. If a remote unit desires to send a message, it first checks the status of the busy/idle flag. If the flag is set to idle, then the remote unit transmits its message. If the flag is set to busy then the remote unit "backs off" or waits for a random number of time slots before checking the status flag again. Backing off a random number of slots rather than just trying at the immediately following slot somewhat reduces the possibility of multiple remote units beginning transmissions at the same time. When a remote unit transmits at the same time as another remote unit, a collision occurs and the transmission of both messages is unsuccessful. When a collision occurs, the base unit informs the remote units through the use of a decode flag. The base unit sets the decode flag to true to indicate that it has successfully received and decoded a transmission in a previous time slot or sets the flag to false if it detected a transmission but was unable to decode it. A remote unit that has sent a transmission checks the decode flag to determine if the transmission has been successfully received. When two or more remote units have transmitted at the same time, the base unit will be unable to decode the transmission, the decode flag will be set to false, and the remote units will know that there has been a collision and that the transmissions must be retried at a later time. Additional description of this time sharing scheme can be found in U.S. patent application Ser. No. 09/148,315 entitled "Method and Apparatus For Controlling Access to a Communication Channel", filed on Sept. 4, 1998, now Abandoned, the contents of which are incorporated herein by reference.

However, this time sharing scheme has some shortcomings. Due to hardware and software latency, a delay period, generally called a collision interval, exists between when a remote unit starts accessing the reverse channel and when the other remote units detect that the base station has switched the busy/idle flag to busy. Problems arise when a second remote unit attempts to start accessing the channel during this delay period, thus causing a collision and requiring both remote units to retransmit their respective messages. These collisions result in wasted bandwidth and can significantly reduce the efficiency of the wireless channel especially as the number of remote units sharing the channel increases. Additionally, there is a time lag between when the transmission from the remote unit ends and when the busy/idle flag is set to idle, resulting in wasted bandwidth before another remote unit begins transmitting. This lag is called an inter-transmission gap. Both of these scenarios are described in detail as follows.

Figure 1:
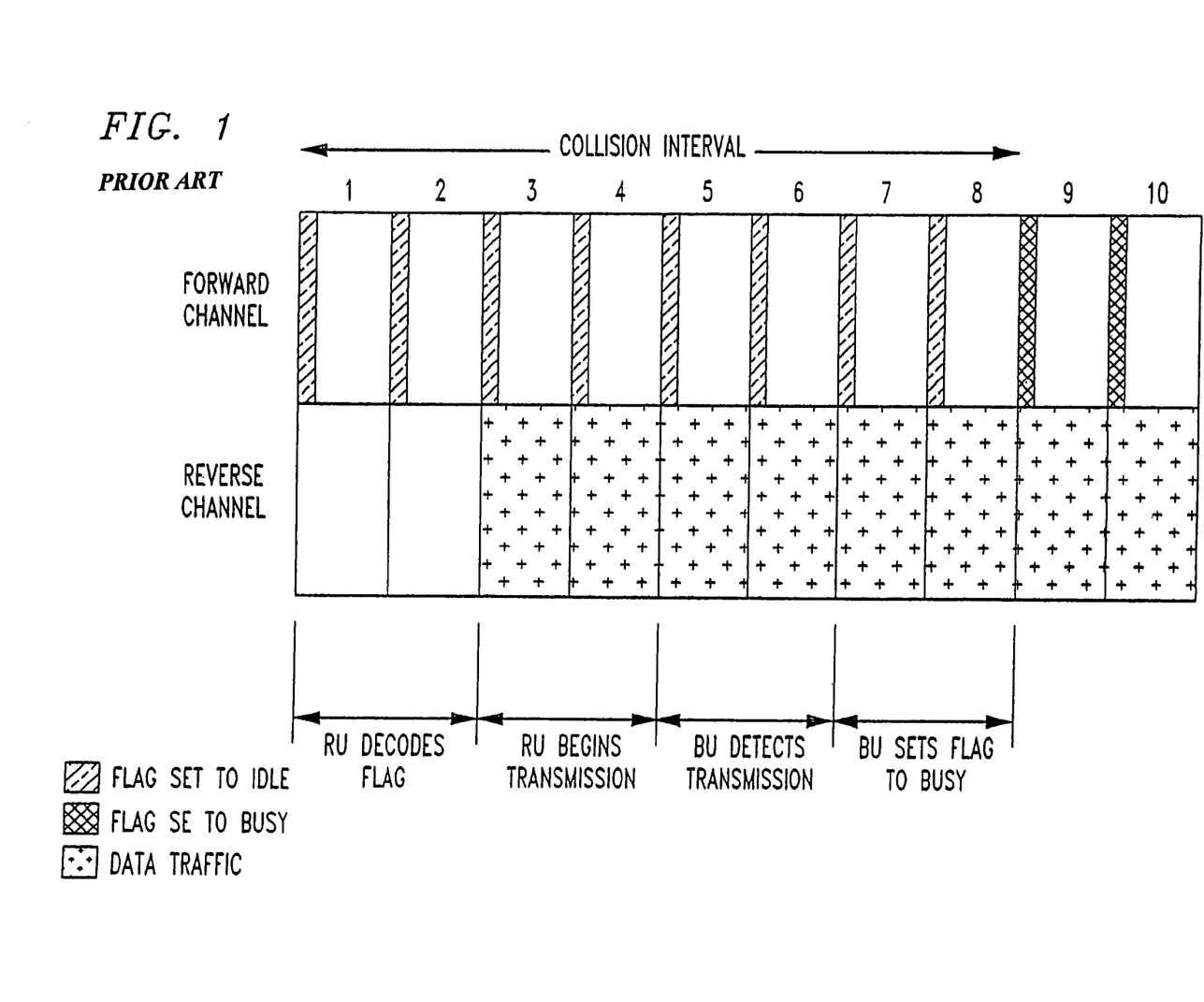
FIG. 1 illustrates the collision interval that exists in the prior art system as a result of the time lag in changing the status flag for the reverse channel.

In order to implement a time sharing scheme, the wireless channel is divided into timeslots. A remote unit may seize the channel and begin transmitting at the beginning of any timeslot when the remote unit has detected the busy/idle flag to be set to idle. However, depending on the size of the timeslot, the amount of time that the base unit requires to change the state of the busy/idle flag and the amount of time that the remote unit requires to decode the busy/idle flag received from the base unit, there is a time lag likely to be equivalent to several timeslots during which the busy/idle state flag that the remote unit is using to decide whether or not to seize the channel may not reflect the actual state of the wireless channel. As a result, the remote unit may determine that the wireless channel is idle and attempt to seize the wireless channel when in fact it has already been seized by another remote unit during the delay. As illustrated in FIG. 1, the Base Unit (BU) has set the busy/idle flag to idle at slot 1 because no traffic is being sent on the reverse channel. A Remote Unit (RU) detects and decodes the flag, determines that the reverse channel is free and begins transmission of data in slot 3. Due to hardware latency, there is a lag of several slots before the BU detects the transmission and sets the flag to busy beginning with slot 9. After slot 9, any other RU that checks the flag will see that the reverse channel is busy and not begin transmitting; however, between slots 1 and 8, any RU that checks the flag will begin transmitting, having determined that the channel is idle when it is not because the busy/idle flag has falsely identified the channel as being available. A collision will result and both RUs will have to retransmit their messages later. The time frame between slots 1 and 8 is the collision interval.

Figure 2:
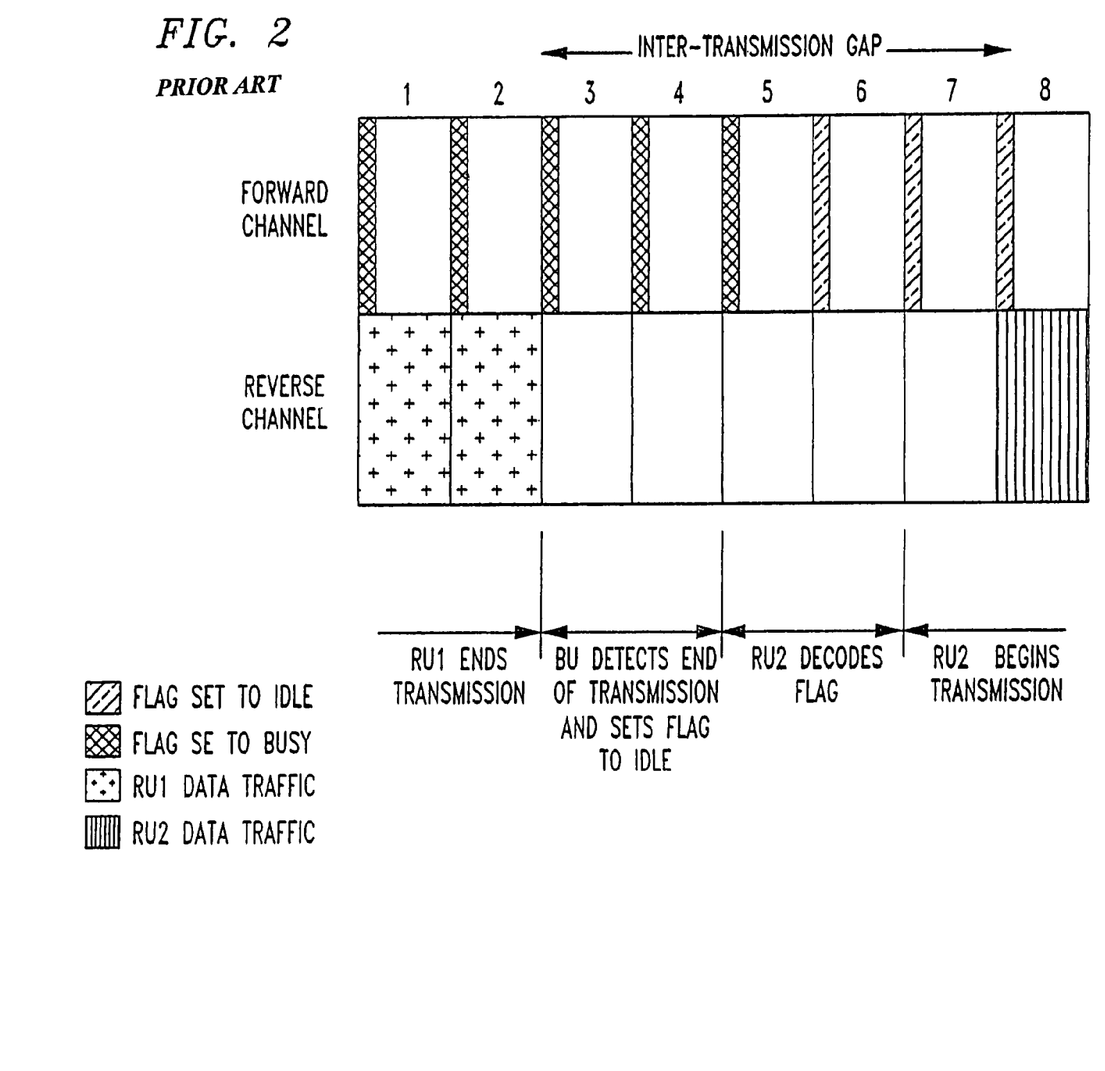
FIG. 2 illustrates the inter-transmission gap that exists in the prior art system as a result of the time lag in changing the status flag for the reverse channel.

As illustrated in FIG. 2, when the first RU (RU1) finishes transmitting on the reverse channel, there is a delay of several time slots while the BU detects that the transmission has ended and changes the busy/idle flag on the forward channel to idle. There is also a delay while a second RU (RU2) detects and decodes the flag before it can begin transmitting in the reverse channel. The time frame between slots 3 and 7 is the inter-transmission gap. During this time frame, RU2 may have had data to transmit but refrained from transmitting because the flag falsely indicated that the reverse channel was busy. Therefore, in order to avoid a possible collision that did not in fact exist, RU2 did not transmit during that time frame and the bandwidth was wasted.

The present invention addresses both of these shortcomings.

SUMMARY OF THE INVENTION

The present invention provides a method for improving the efficiency of the wireless network by eliminating collision intervals and inter-transmission gaps on the shared channel. A further enhancement reduces the amount of control traffic that is transmitted on the forward channel.

Eliminating the collision interval may be accomplished by defining a "superslot" consisting of a block of time slots equivalent to the time delay. The base unit and remote units are synchronized on this superslot so that the base unit sets the beginning of the superslot by sending the busy/idle flag and the remote units can only attempt a transmission immediately after they receive the busy/idle flag. When a remote unit wishes to transmit, it must wait until the beginning of the next superslot (i.e., the next time the base unit transmits the busy/idle flag) to detect the state of the wireless channel. This means that a remote unit will never detect a false idle state because the length of the superslot ensures that a change in the busy/idle flag resulting from another remote unit beginning to transmit in the previous superslot has propagated correctly to the other remote units. This will eliminate those collisions occurring because of the time lag in propagating the state change. The only collisions that will occur are those resulting from more than one remote unit beginning a transmission at the beginning of the same superslot.

Elimination of the inter-transmission gap may be accomplished by using the length of the transmission to allow the base unit to calculate when the transmission will end and to change the state flag to coincide with the end of the transmission. When a remote unit seizes the wireless channel and begins transmitting data, the remote unit transmits an "access burst" that tells the base unit the length of the data transmission. Based on the length of the incoming data transmission, the base unit can calculate when the transmission will be completed. Using this calculation combined with knowledge of the time delay required for a change in the state of the busy/idle flag to be detected by the remote units, the base unit can change the state flag before the transmission is completed, so that the transmission ends simultaneously with when the remote units detect the idle flag. This results in elimination of the inter-transmission gap and increases the efficiency of the system by allowing for complete use of the bandwidth of the wireless channel.

The efficiency of the time sharing scheme may be further improved by combining the decode flag with the busy/idle flag, thus reducing the amount of bandwidth that is used on the forward channel to convey status/control information to the remote units. This can be accomplished by using the busy and idle states to correspond to the success and failure states of the decode flag. Normally when a collision occurs, the decode flag is set to failure which alerts the transmitting remote units that a collision has occurred and the remote units stop transmitting, leaving the channel idle. The present invention simplifies this process by setting the busy/idle flag to idle when there has been a collision. This alerts the transmitting units that a collision has occurred because if their transmission had been successful, the flag would be set to busy; therefore since the flag is set to idle, the transmitting units determine that a collision must have occurred. Additionally, setting the flag to idle indicates to the other remote units that they can now use the reverse channel because the transmitting units will have left the channel idle once they are notified of the collision.

The present invention is explained in more detail below.

DETAILED DESCRIPTION

Figure 5:
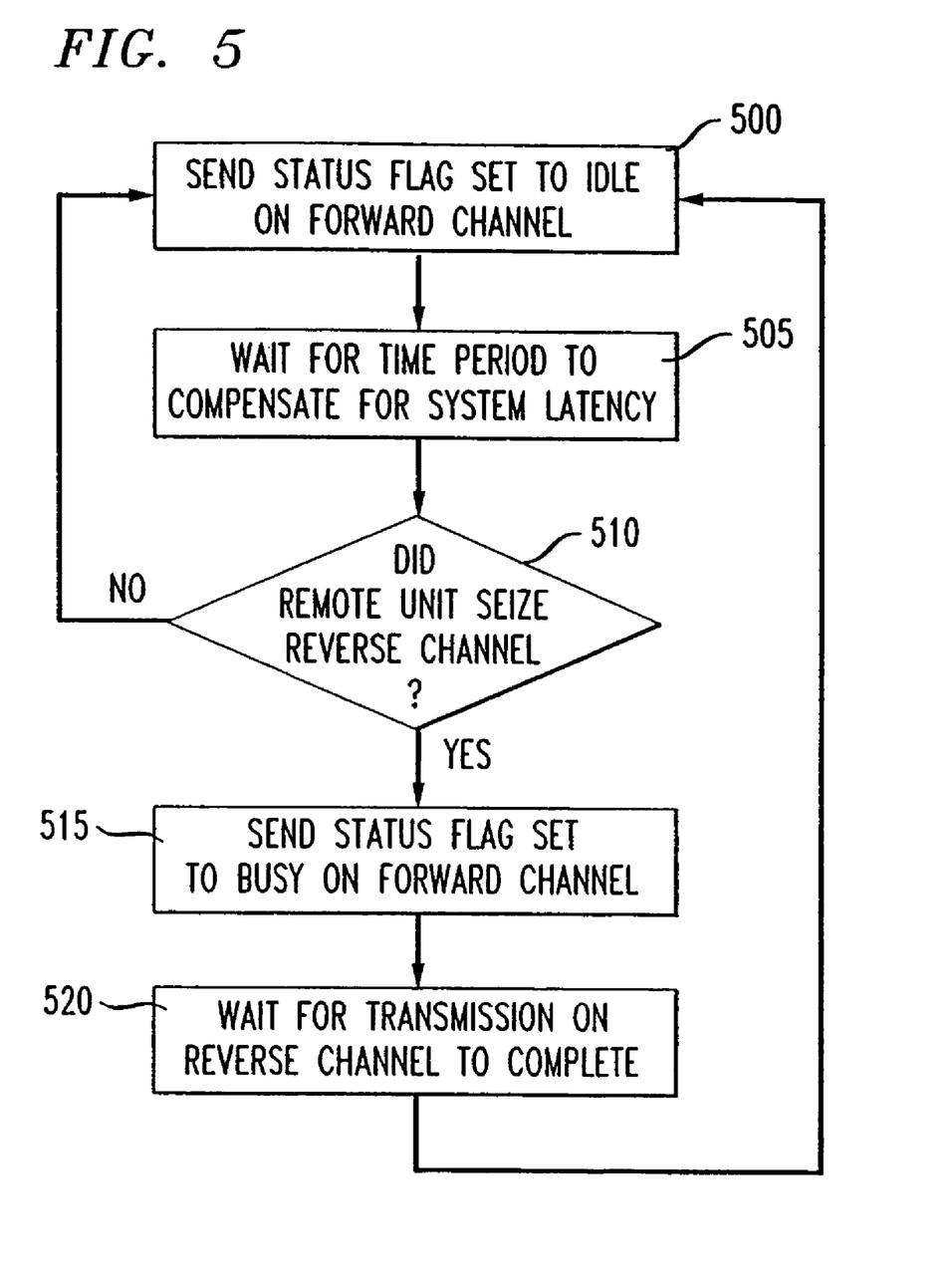
FIG. 5 illustrates an embodiment of the method of the present invention to eliminate the collision interval.

An example of one possible implementation of the method of the present invention to eliminate the collision interval is illustrated in FIG. 5. The base unit sets the beginning of the superslot by sending the status flag to the remote units on the forward channel with the flag set to idle (500). The base unit then waits for a period of time based on the latencies present in the system (i.e., the length of the superslot) (505). During this time period, the base unit monitors the reverse channel to determine if a remote unit has "seized" the channel by beginning to transmit data (510). If no remote unit has seized the channel during the superslot, then the base unit sends the idle flag again (500), thus starting the next superslot and the cycle repeats. If a remote unit has seized the channel, then the base unit sends a busy flag on the forward channel to indicate to the other remote units that the reverse channel is in use and no other remote unit should begin transmitting (515). Once the remote unit that seized the channel has completed transmitting (520), the base unit sends the idle flag on the forward channel (500) to indicate to the remote units that the reverse channel is once again available for transmission and the cycle repeats.

The time period that the base unit waits to determine whether a remote unit has seized the channel, essentially the length of the superslot, is dependent on a wide variety of factors in the wireless network and could vary significantly from network to network. Important factors in determining how long this time period should be include hardware and software latencies in transmitting, receiving, and decoding the status flag messages, hardware and software latencies in seizing the channel by the remote unit and detecting the seizure by the base unit, the length of the timeslots used by the time sharing scheme, and the physical distance that the transmissions must travel between the base unit and remote units.

Figure 3:
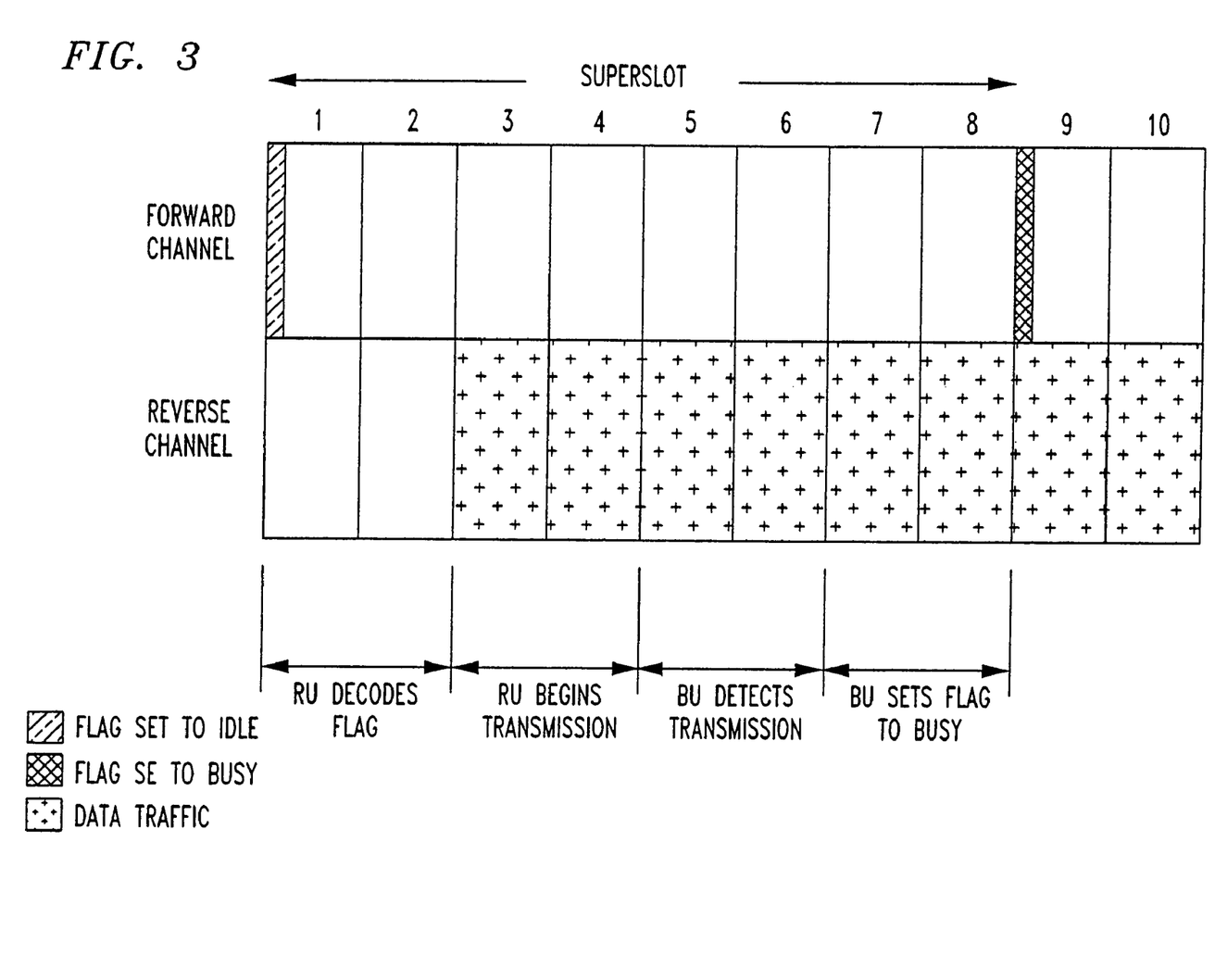
FIG. 3 illustrates the elimination of the collision interval according to an embodiment of the present invention.

As shown in FIG. 3., the superslot spans the collision interval and no status flags are sent during this time. As a result, the remote units must wait to detect the state of the reverse channel and therefore will not start a transmission during the collision interval, thus reducing the number of collisions. Sending the busy/idle flag only once per several timeslots instead of in every timeslot also results in improved bandwidth usage on the forward channel by reducing the number of control messages, thereby increasing the bandwidth available to data.

Figure 6:
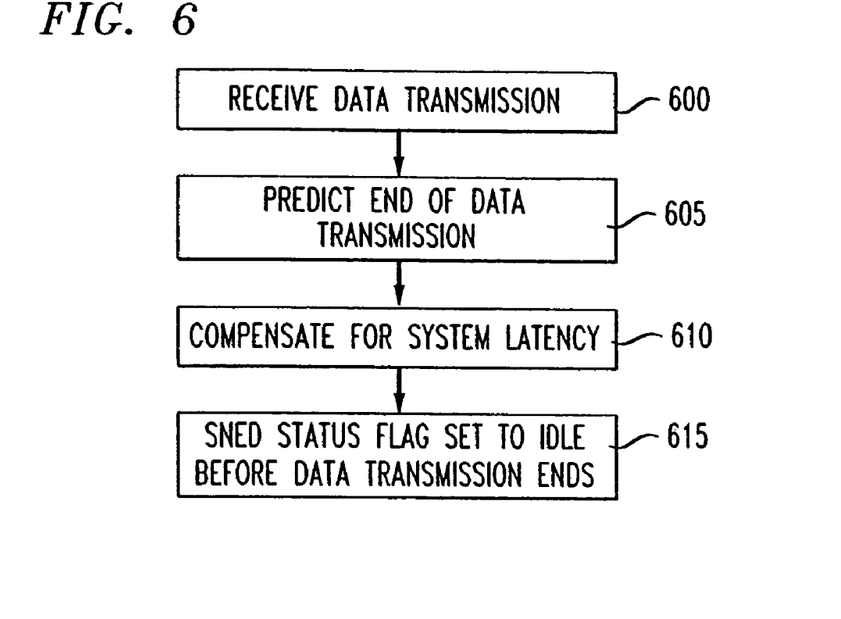
FIG. 6 illustrates an embodiment of the method of the present invention to eliminate the inter-transmission gap.

An example of one possible implementation of the method of the present invention to eliminate the inter-transmission gap is illustrated in FIG. 6. The base unit receives a data transmission from a remote unit (600). The base unit extracts information from this transmission to determine or predict when the transmission will be complete (605). The extracted information could be any number of indicators from which the base unit could determine the duration of the transmission, including a numeric value for the length of the transmission that was provided by the remote unit, a numeric value for the time of completion of the transmission that was provided by the remote unit, or the transmission itself could be of a type that has a known or predetermined length. Based on the predicted time of completion and the known value of latency in the system, the base unit determines the time at which the idle status flag can be sent from the base unit while the transmission is still being received such that by the time the flag is received and decoded by the remote units, the transmission has completed and the channel is idle (610). When the determined time arrives, the base unit sends the idle flag (615).

Figure 4:
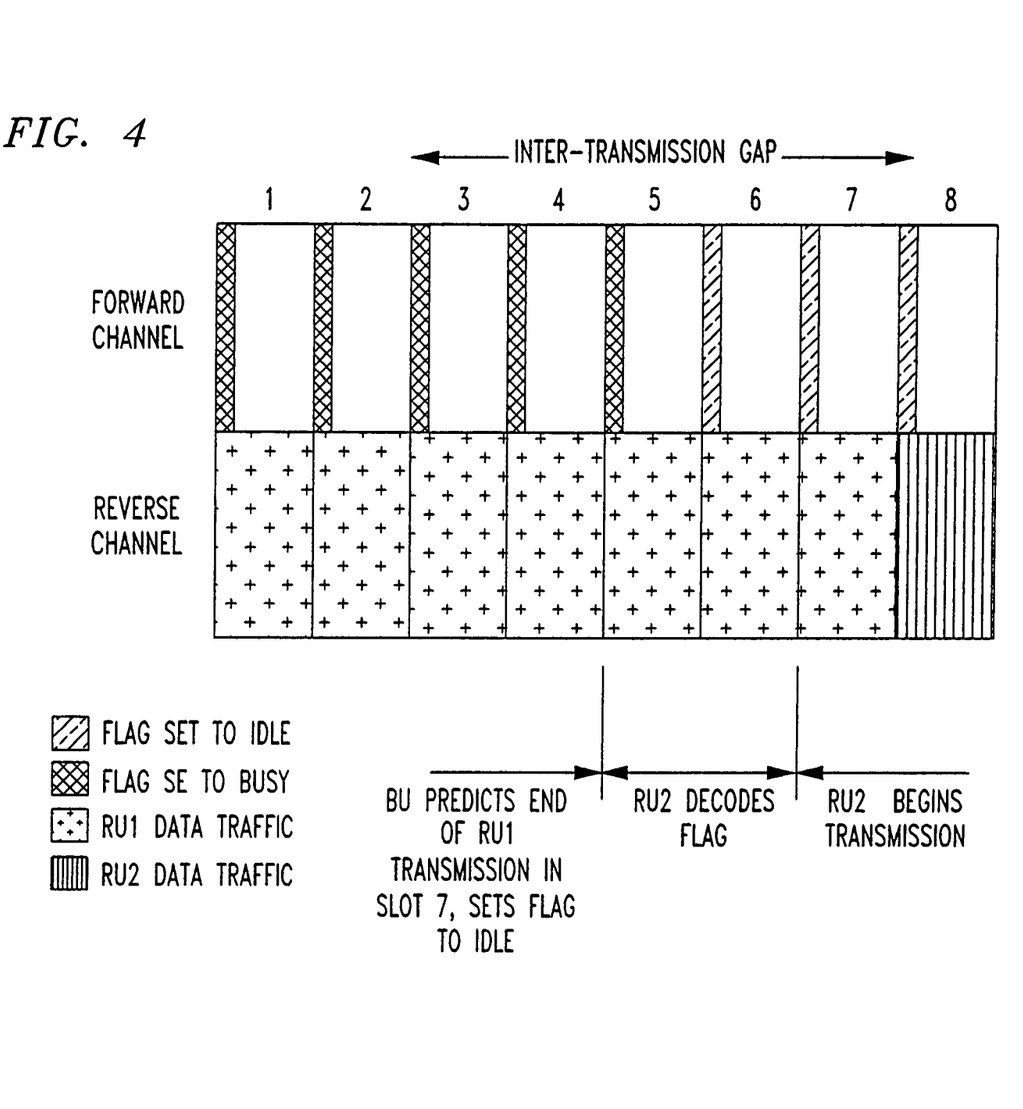
FIG. 4 illustrates the elimination of the inter-transmission gap according to an embodiment of the present invention.

As shown in FIG. 4, the inter-transmission gap is eliminated. The transmission by the second remote unit (RU2) begins in the time slot immediately following the end of the transmission by the first remote unit (RU1).

Figure 7:
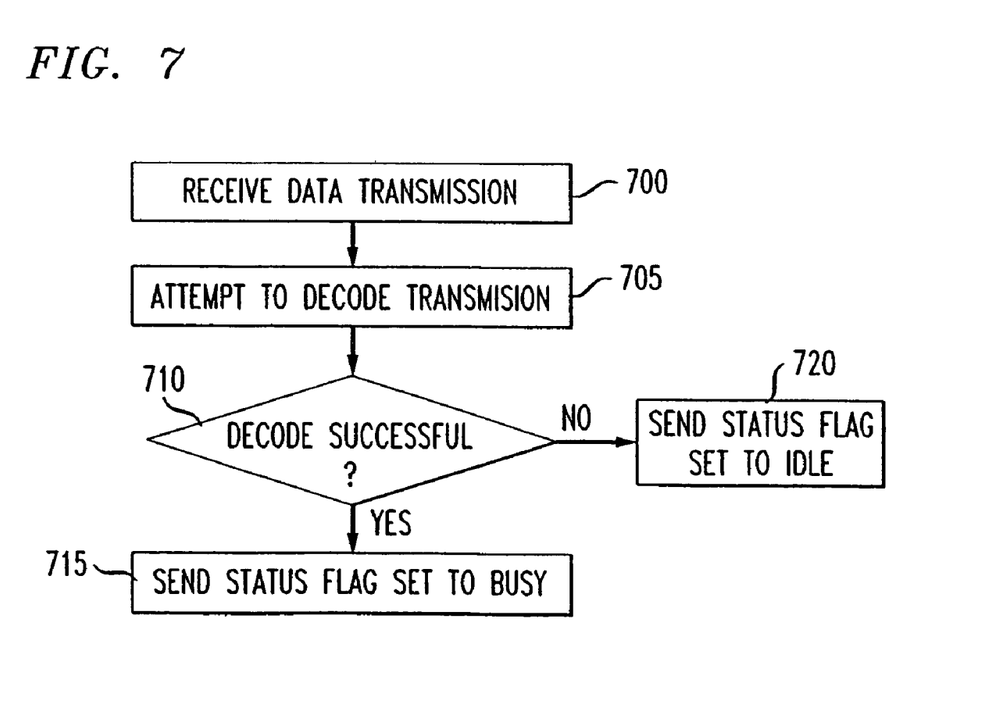
FIG. 7 illustrates an embodiment of the method of the present invention to use a single flag to indicate busy/idle status and decode success/failure.

An example of one possible implementation of the method of the present invention to replace the status flag and the decode flag with a single flag is illustrated in FIG. 7. The base unit receives a transmission on the reverse channel (700). The base unit then attempts to decode the contents of the transmission (705). This decode process is successful if the base unit extracts valid information from the transmission and unsuccessful if the base unit cannot extract valid information (710). If the decode was successful, then the base unit transmits a single binary flag set to busy/success on the forward channel (715). The transmitting remote unit interprets this flag as a sign that its transmission was successful, there was no collision with another remote unit, and permission to continue transmitting. The non-transmitting remote units receive the busy/success flag as a sign that another remote unit has seized the reverse channel and they should not transmit until a flag is received indicating that the channel is idle. If the decode was unsuccessful, the base unit transmits a single binary flag set to idle/fail on the forward channel (720). The transmitting remote unit(s) interpret this flag as indicating that its transmission failed either due to a collision with another remote unit's transmission or due to some other problem (e.g., signal interference or fading), and they should cease transmission and try again later. The non-transmitting remote units interpret the idle/fail flag as a sign that no remote unit currently has seized the channel and that they may attempt to transmit.

Figure 8:
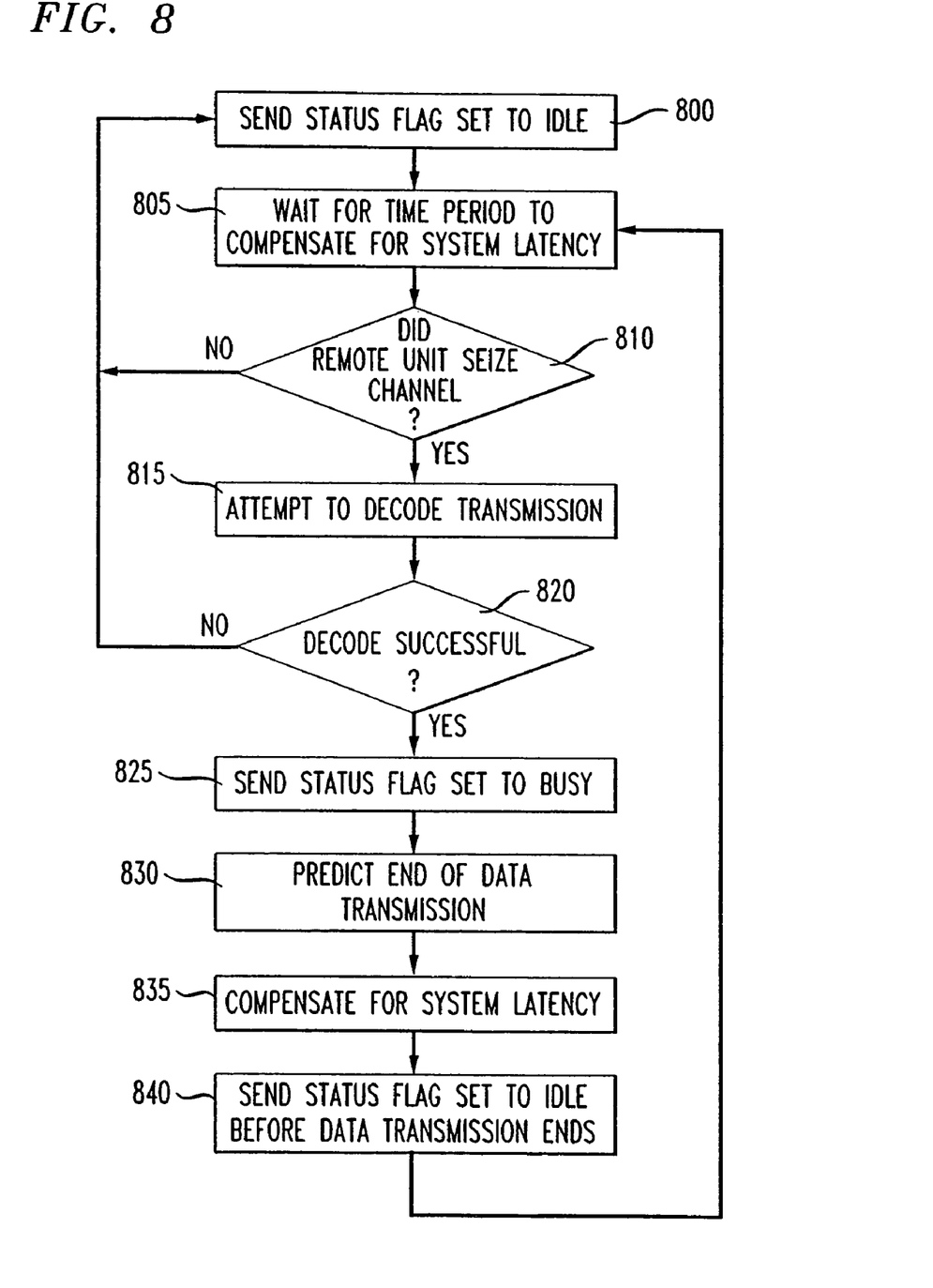
FIG. 8 illustrates an embodiment of the method of the present invention to eliminate the collision interval and the inter-transmission gap, and use a single flag to indicate busy/idle status and decode success/failure.

FIG. 8 illustrates a possible implementation of the present invention incorporating the elimination of the collision interval and inter-transmission gap, and the replacement of the two flags with a single binary flag. The base unit sets the beginning of the superslot by sending a status flag set to idle/fail (800). The base unit then monitors the reverse channel for a period of time to allow for the latency of the wireless system (805). If at the end of that time period, no remote unit has seized the channel, the base unit again sends the idle/fail flag (810). If a remote unit has seized the channel by beginning to transmit, then the base unit attempts to decode the transmission (815). If the decode process is unsuccessful then the base unit transmits the idle/fail flag (820). If the decode process is successful, the base unit transmits the busy/success flag (825). The base unit also extracts information from the transmission that is used to predict when the transmission will be complete (830). Using this information as well as the known latency of the system, the base unit calculates when the idle/fail flag can be transmitted such that it is received and decoded by the remote units so that a new transmission may begin as soon as the current transmission is complete (835). When this time arrives, the base unit sends the idle/fail flag (840). Combining these methods in the present invention results in improved efficiency and bandwidth usage on the reverse channel through the reduction in collisions and inter-transmission gaps, and improved bandwidth usage on the forward channel by reducing the number and size of the control messages.

The present invention is not limited to the specific embodiments described. It is expected that those skilled in the art will be able to devise other implementations that embody the principles of the present invention and remain within its scope.

What is claimed is:

1. A method for reducing collisions in a time sharing wireless system comprising:
   transmitting by a base unit on a wireless channel a superslot comprising a plurality of timeslots and including only a single status message at the beginning of the superslot, wherein a total length of the superslot is determined to mitigate occurrence of a collision during a collision interval;
   monitoring said wireless channel; and
   when a seizure of said wireless channel occurs, toggling a state of the single status message for a next superslot.

2. The method of claim 1 further comprising:
   receiving at a remote unit said superslot; and
   determining at said remote unit, based on said status message in said superslot, whether to seize said wireless channel.

3. The method of claim 2 wherein said status message is further used to indicate whether the base unit has successfully decoded a previous transmission.

* * * * *